US007308178B2

(12) United States Patent
Bourova et al.

(10) Patent No.: US 7,308,178 B2
(45) Date of Patent: Dec. 11, 2007

(54) DOPED-RING AMPLIFYING OPTICAL FIBER, AND AN AMPLIFIER CONTAINING SUCH A FIBER

(75) Inventors: Ekaterina Bourova, Boulogne-Billancourt (FR); Christian Simonneau, Antony (FR); Catherine Martinelli, Palaiseau (FR); Lionel Provost, Marcoussis (FR)

(73) Assignee: Alcatel, Paris (FR)

( * ) Notice: Subject to any disclaimer, the term of this patent is extended or adjusted under 35 U.S.C. 154(b) by 85 days.

(21) Appl. No.: 10/791,382

(22) Filed: Mar. 3, 2004

(65) Prior Publication Data

US 2004/0196536 A1 Oct. 7, 2004

(30) Foreign Application Priority Data

Mar. 4, 2003 (FR) .................................. 03 02602

(51) Int. Cl.
*G02B 6/00* (2006.01)
(52) U.S. Cl. ...................................... 385/127
(58) Field of Classification Search ................ 385/127, 385/126
See application file for complete search history.

(56) References Cited

U.S. PATENT DOCUMENTS

| 3,784,386 | A | * | 1/1974 | Araujo et al. ............... 501/13 |
| 5,485,480 | A | * | 1/1996 | Kleinerman ................... 372/6 |
| 5,778,129 | A |   | 7/1998 | Inagaki |
| 5,781,684 | A | * | 7/1998 | Liu .............................. 385/124 |
| 5,926,600 | A | * | 7/1999 | Pavlath ........................ 385/142 |
| 6,043,930 | A | * | 3/2000 | Inagaki ...................... 359/341.4 |
| 6,175,445 | B1 | * | 1/2001 | Desthieux et al. ......... 359/341.5 |

(Continued)

FOREIGN PATENT DOCUMENTS

EP   1 043 815 A2   10/2000

(Continued)

OTHER PUBLICATIONS

K. Rottwitt, J. Bromage and L. Leng. "Scaling the raman gain coefficient of optical fibers" ECOC 2002, proceedings, vol. 3, symposium 3.3, Copenhagen, Denmark (Sep. 11, 2002). http://www.ofsinnovations.com/resources/documents/ECOC2002_s3_03.pdf.*

(Continued)

*Primary Examiner*—Jack Keith
*Assistant Examiner*—Ari M. Diacou
(74) *Attorney, Agent, or Firm*—Sughrue Mion, PLLC

(57) ABSTRACT

The amplifying optical fiber (1) comprises a single-mode core (10) and a multimode core (20) surrounding the single-mode core, the multimode core containing a doped layer referred to as a "doped ring" (21) and having a certain concentration of active rare earth ions (6) to perform amplification by active rare earth ions on at least one optical signal for injection into the amplifying fiber. The fiber is dimensioned so that the product of its length multiplied by its Raman efficiency is greater than or equal to 0.5 $W^{-1}$. In addition, the fiber presents absorption defined by an absorption coefficient expressed in dB/m, which absorption presents, at a certain wavelength, a maximum value referred to as the "absorption maximum", the fiber presents accumulated absorption, corresponding to the product of its length multiplied by the absorption maximum, that is greater than or equal to 100 dB. The invention also provides an amplifier including such a fiber, a single-mode pump, and a multimode pump.

10 Claims, 3 Drawing Sheets

U.S. PATENT DOCUMENTS

| | | | |
|---|---|---|---|
| 6,240,108 B1* | 5/2001 | Ionov | 372/6 |
| 6,266,467 B1* | 7/2001 | Kato et al. | 385/123 |
| 6,275,632 B1* | 8/2001 | Waarts et al. | 385/37 |
| 6,288,835 B1* | 9/2001 | Nilsson et al. | 359/341.3 |
| 6,363,194 B1* | 3/2002 | DiGiovanni et al. | 385/123 |
| 6,483,974 B1* | 11/2002 | Waarts | 385/123 |
| 6,516,124 B2* | 2/2003 | Po | 385/126 |
| 2001/0022884 A1* | 9/2001 | Bayart et al. | 385/123 |
| 2002/0131742 A1* | 9/2002 | Bayart et al. | 385/125 |
| 2004/0085623 A1* | 5/2004 | Provost et al. | 359/341.1 |
| 2005/0157998 A1* | 7/2005 | Dong et al. | 385/126 |

FOREIGN PATENT DOCUMENTS

| | | |
|---|---|---|
| WO | WO 98/25326 A1 | 6/1998 |

OTHER PUBLICATIONS

Fundamentals of Photonics Bahaa E. A. Salen, Malvin Carl Teich © 1991 John Wiley & Sons, Inc. ISBNs: 0-471-83965-5 (Hardback); 0-471-2-1374-8 (Electronic) (pp. 272-309).*

Jaedeuk Lee et al, "Coaxial-core erbium-doped fibre amplifiers for self-regulation of gain spectrum", Electronics Letters, IEE Stevenage, GB, vol. 34, No. 19, Sep. 17, 1998, pp. 1852-1854, XP006010352.

S. J. Strutz et al, "Low-noise hybrid erbium/Brillouin amplifier", Electronics Letters, IEE Stevenage, GB, vol. 36, No. 16, Aug. 3, 2000, pp. 1359-1360, XP006015570.

* cited by examiner

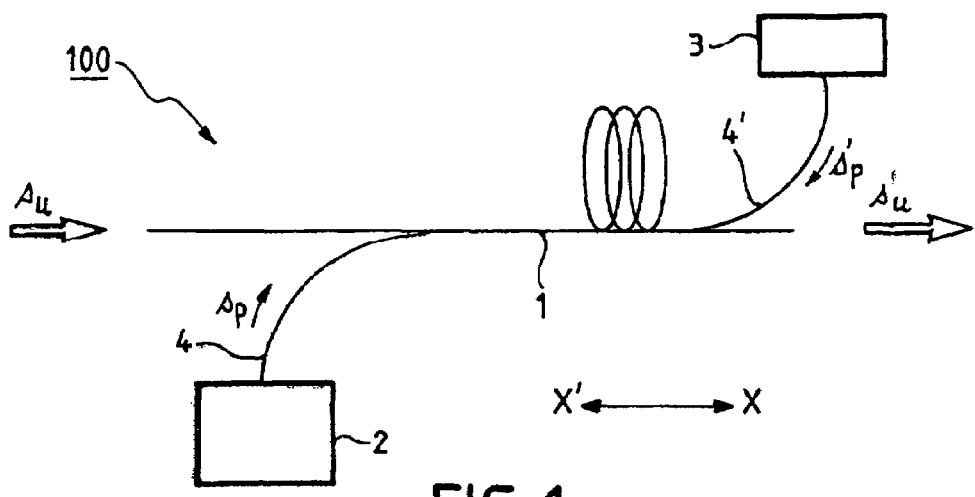
FIG_1
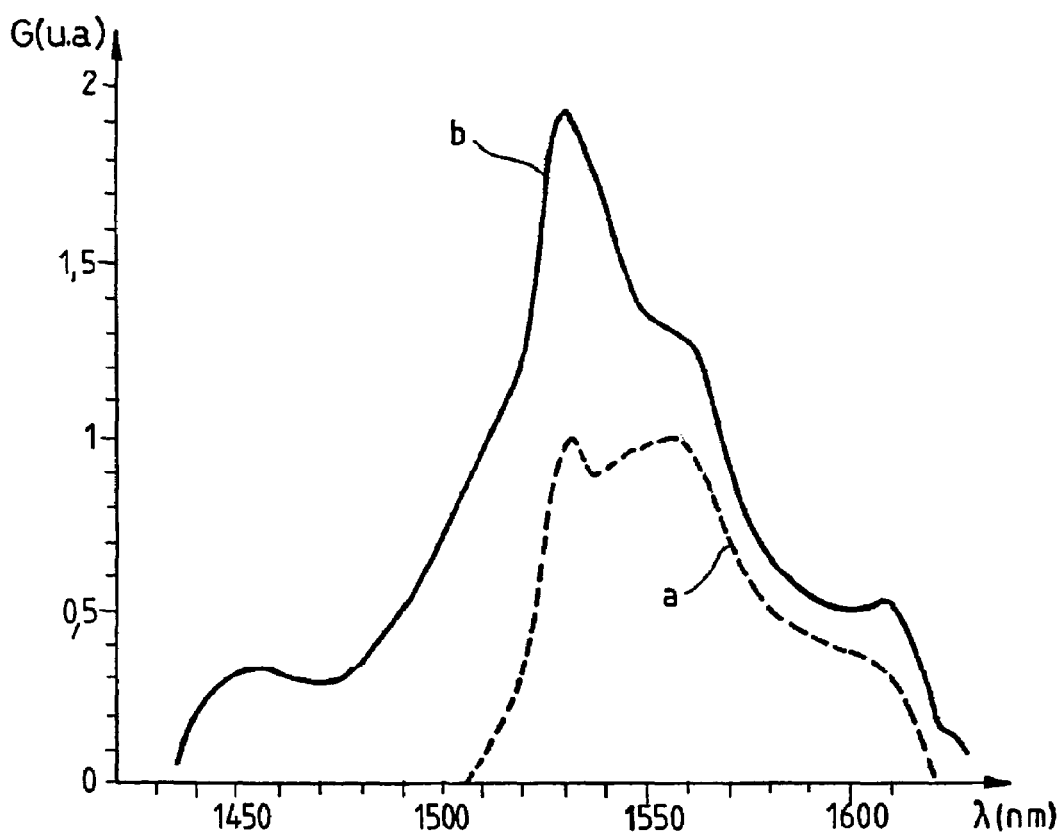
FIG_2

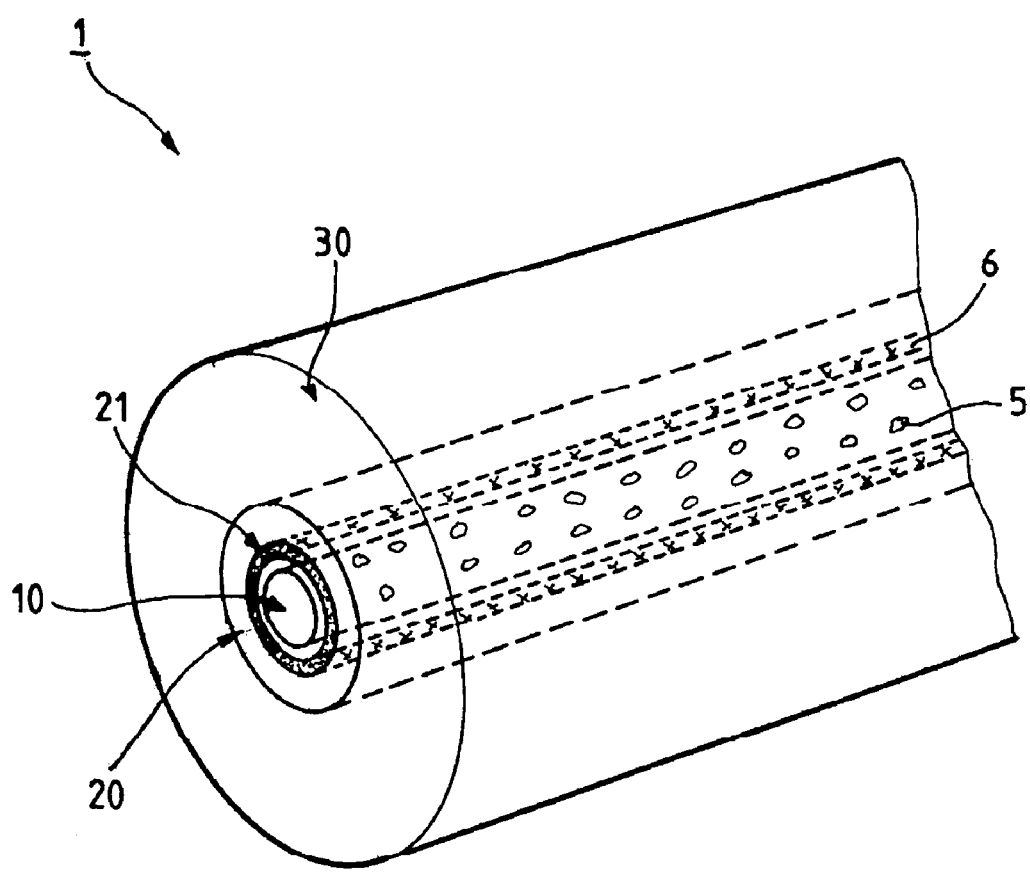
FIG_3a

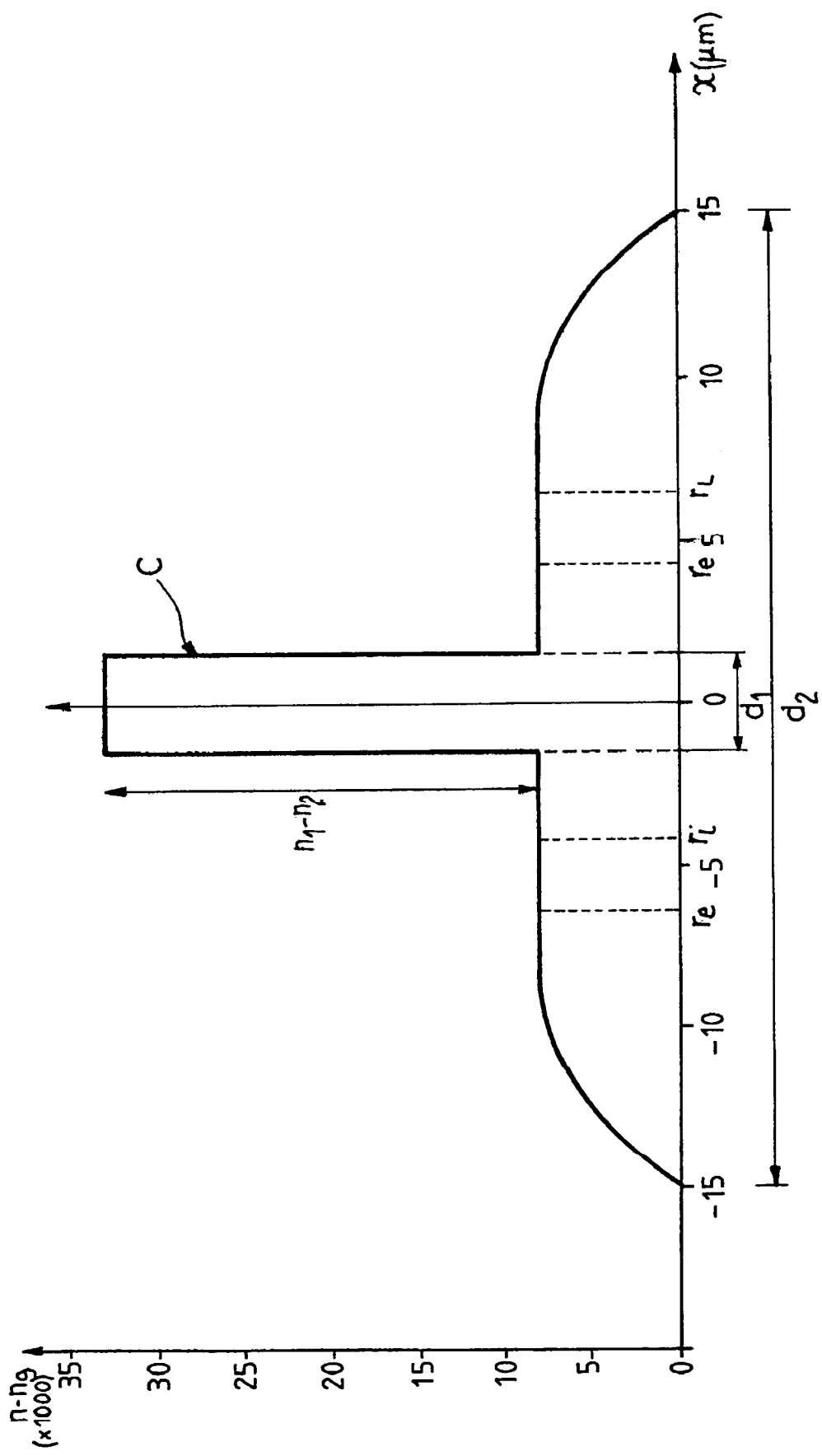
FIG_3b

DOPED-RING AMPLIFYING OPTICAL FIBER, AND AN AMPLIFIER CONTAINING SUCH A FIBER

The present invention relates to the field of optical fiber telecommunications. More precisely, the invention relates to a doped-ring amplifying optical fiber and to an amplifier containing such a fiber.

In known manner, it is desired to increase the performance of erbium-doped fiber amplifiers (EDFAs), which amplifiers are generally used on long-distance optical links in order to amplify wavelength division multiplexed (WDM) signals.

The fibers are designed to obtain the most efficient amplification possible over a wavelength band that is as broad as possible or over a plurality of bands such as band C (1530 nanometers (nm) to 1565 nm) or band L (1565 nm to 1625 nm).

The document entitled "30% power conversion efficiency from a ring-doped all-silica octagonal Yb-free double-clad fiber for WDM applications in C-band" by P. Bousselet et al., in Optical Amplifiers and Their Applications Conference, PD1, 2001 Technical Digest, Optical Society of American, pp. 2-4, discloses an EDFA amplifier incorporating a silica-based amplifying optical fiber. More precisely, the optical fiber presents the following structure:

- a single-mode core, having a central region with a diameter equal to 7 micrometers ($\mu$m);
- a multimode core, being an intermediate region surrounding the central region and having an outer diameter equal to 44 $\mu$m, the multimode core containing a layer doped in active erbium ions, referred to as a "doped ring"; and
- cladding, an outer region surrounding the intermediate region and having an outer diameter equal to about 150 $\mu$m.

The EDFA also includes a multimode pump of power equal to 2.3 watts (W), delivering a pump wave at a wavelength equal to 980 nm, and coupled to the amplifying fiber by a single-mode fiber and a wavelength multiplexer. In order to be amplified, multiplexed optical signals of wavelengths in band C are injected into the amplifying fiber.

The EDFA disclosed possesses gain in band C that is greater than that of conventional EDFAs because of better conversion efficiency in said erbium-doped ring amplifying fiber.

The object of the present invention is to devise a compact and integrated fiber amplifier of low cost and having performance that is further improved in terms of efficiency, amplification level, number of channels (enlarging band C and/or L or new gain ranges . . . ), and amplified signal quality (low noise level, low dependency on variations in pumping power, . . . ).

To do this, the invention seeks to make it possible to make a hybrid amplifier making effective use both of the Raman effect and of the amplifying properties of active rare earth ions such as erbium ions. The amplifier then benefits from the combined advantages of both amplification techniques.

A few definitions of parameters involved in the invention are initially recalled.

To a first approximation, the Raman efficiency Cr of a fiber is defined by the equation:

$$\mathrm{Log}\,(Pon/Poff) = Cr.Pp.L$$

in which Log is the Napierian logarithm, L is the length of the fiber, Pp is the power of a Raman pump wave injected into the fiber, Pon is the optical power at the outlet of the fiber, Pon is the optical power at the outlet of the giber of an optical signal that has traveled along the fiber in the presence of the pump wave, and Poff is the optical power at the outlet of the fiber of the same optical signal that has traveled along the fiber in the absence of the pump wave.

Another way of expressing the above relationship involves the Raman "on/off" gain, Gonoff, which, expressed in decibels (dB), can be estimated by the formula given below, which applies to an amplifier of short length and providing the attenuation of the Raman pump is weak (less than 2 decibels per kilometer (dB/km):

$$Gonoff = 10\,\log(Pon/Poff) = 4.34\,Cr.Pp.L$$

in which log is the base 10 logarithm.

Raman efficiency Cr is expressed per watt and per kilometer ($W^{-1}\,km^{-1}$) and can lie in the range 0.5 $W^{-1}\,km^{-1}$ to 5 $W^{-1}\,km^{-1}$, for example.

In addition, the presence of active rare earth ions in a fiber implies that the fiber absorbs an injected optical signal traveling along it. If an appropriate pump wave is injected, the fiber is also the seat of stimulated emission, and the difference between emission and absorption constitutes the gain of the doped fiber. This absorption is defined by an absorption coefficient expressed in decibels per meter (dB/m) which presents a maximum value as a function of signal wavelength known as the absorption maximum. This absorption maximum is also expressed in dB/m and is defined as the absorption peak. The absorption peak is obtained for a wavelength that also corresponds to the emission maximum and lies around 1530 nm for erbium, for example.

Thus, the present invention provides a doped ring amplifying optical fiber comprising:

- a single-mode core of given diameter; and
- a multimode core surrounding the single-mode core and containing a doped layer referred to as a "doped ring", having a certain concentration of active rare earth ions, the fiber being suitable, because of the active rare earth ions, for amplifying an optical signal for injection into the amplifying fiber;
- the fiber being characterized in that it is of a length and has Raman efficiency such that the product of said length multiplied by said Raman efficiency is greater than or equal to 0.5 $W^{-1}$, and in that, for said fiber presenting absorption for an injected optical signal due to the presence of active rare earth ions, said absorption being defined by an absorption coefficient expressed in dB/m and presenting a maximum value as a function of the wavelength of said signal, which value is referred to as the absorption maximum, said fiber presents accumulated absorption, corresponding to the product of said length multiplied by said absorption maximum, which is greater than or equal to 100 dB.

For a given Raman efficiency, the invention amounts to selecting a wavelength that is long enough to obtain appreciable Raman gain, at limited Raman pump power, and accumulated absorption adapted to the desired level of rare earth ion amplification gain. The accumulated absorption condition also implicitly gives a limiting value on the length of fiber that allows rare earth ion gain to exist, it being understood that such gain diminishes and then disappears if the length of the fiber is increased beyond a certain limit.

Thus, the absorption maximum, the length of the fiber, and the Raman efficiency are parameters that are interrelated, and they are judiciously selected to make both types of amplification effective.

It is appropriate at least for the length of fiber to be selected to be short enough to ensure that amplification by active rare earth ions provides gain of not less than 1 dB. Naturally, it is preferable to select a length that provides gain that is much greater, it being understood, for example, that erbium ion amplification makes it possible under such conditions to achieve gain of about 60 dB, by providing sufficient erbium pump power.

The two types of gain are cumulative in the sense that they can add when they act on a common range of wavelengths or they can enable optical signals to be amplified in two distinct ranges that do not overlap.

For example, the Raman gain may correspond to at least 10% of the erbium gain.

An accumulated absorption of about 100 dB at 1530 nm makes it possible, for example, to obtain erbium amplification gain of about 20 dB over band C.

In addition, to obtain 2 dB of Raman gain, for example, with a 1 W pump, it is necessary to have a fiber that is about 1 km long for the least efficient fiber and about 100 m long for the most efficient. Naturally, a greater length enables greater Raman gain to be obtained without requiring greater pump power.

In a first embodiment of the invention, fiber length is greater than or equal to 100 m, and the absorption maximum is less than or equal to 1 dB/m.

The length is adjusted, and more precisely increased, relative to that of prior art doped-ring amplifying fibers, in order to favor the Raman effect. conversely, the absorption maximum is adjusted, and more precisely decreased compared with that of prior art doped-ring amplifying fibers.

Nevertheless, Raman amplification of the invention is discrete since it refers to the Raman effect that occurs over a relatively short length in an amplifying fiber of an amplifier. This amplification differs from Raman amplification of the kind that is commonly referred to as being "distributed" as is obtained directly in a line fiber and relates to the Raman effect implemented over a longer amplification length.

Preferably, Raman efficiency may be greater than or equal to 3 $W^{-1}$ $km^{-1}$ so as to obtain a fiber that is relatively short.

According to a characteristic, the inner radius of the doped ring may be greater than 1.5 µm so as to adjust the absorption maximum to lie in the desired range of values.

According to another characteristic, the concentration of active rare earth ions is selected to be less than or equal to 1000 parts per million (ppm), and when the rare earth ions are erbium ions, less than or equal to 300 ppm, with concentration in these ranges also making it possible to adjust the absorption maximum to lie in the desired range of values.

The concentration in active rare earth ions is lower than the concentration that is usual in prior art doped-ring amplifying fibers.

The selected concentration for active rare earth ions depends on the selected rare earth and on the position of the doped ring. For example, by selecting ytterbium, the maximum acceptable concentration of active rare earth ions is greater than that of erbium. In addition, this concentration also depends on the selected length: the greater the length the smaller the concentration.

Furthermore, the refractive indices selected for the single-mode core and the multimode core also have some influence. More precisely, for the single-mode core having at least a first refractive index and for the multimode core having at least a second refractive index, the difference between the first and second refractive indices is preferably greater than or equal to 0.01. In addition, the diameter of the single-mode core may be selected to lie in the range 3 µm to 5 µm.

A refractive index difference that is sufficiently large and a small core diameter serve to reinforce the single-mode nature of the central core and thus to achieve greater confinement of the fundamental mode of the Raman pump wave and of the multiplexed signals injected into the fiber, thereby increasing Raman efficiency.

In a preferred embodiment, the single-mode core is based on silica or on fluoride glass and it is doped by dopants selected from phosphorous, germanium, tellurium, aluminum, and boron. These dopants contribute to high Raman efficiency.

In a preferred embodiment, the rare earth doped ring is based on silica or on fluoride glass and is doped by additional dopants selected from the following compounds: $Li_2O$, $Na_2O$, $K_2O$, $Rb_2O$, $Cs_2O$, BeO, MgO, CaO, SrO, and BaO. These additional dopants increase amplification by rare earth ions.

When the ring is made of fluoride glass, the active rare earth ions are preferably thulium ions.

Naturally, the present invention also provides an amplifier for amplifying an optical signal, the amplifier comprising:
 a doped ring amplifying optical fiber; and
 a multimode pump coupled to said fiber perform amplification by active rare earth ions,
 characterized in that the amplifying optical fiber is as defined above, and in that it includes at least one single-mode pump coupled to the amplifying optical fiber to perform Raman amplification in addition to said amplification by the active rare earth ions.

In a preferred embodiment, the wavelength of the single-mode pump can be selected to broaden the spectrum of the gain obtained by the active rare earth ions.

In another preferred embodiment, the wavelength of the single-mode pump is selected to lie in the range of wavelengths in which gain is obtained by the active rare earth ions. In this manner, the wavelength of the single-mode pump can benefit from amplification by the active rare earth ions, for example it can be selected to be around 1560 nm for erbium. This amplification of the Raman pump compensates for its loss of energy and enables the Raman gain to be increased.

Depending on the configuration, the Raman gain is involved in a range of wavelengths having a zone in common with the gain range obtained by the rare earth ions, or else situated outside the gain range obtained by the rare earth ions. For example, the Raman gain may occur around 1600 nm associated with amplification by erbium in band C.

Naturally, in this last-mentioned configuration, if optical signals presenting wavelengths in the amplification range are also injected into the fiber, then the wavelength of the single-mode pump is selected to lie between two of these channels.

The features and advantages of the invention will appear clearly on reading the following description made by way of non-limiting illustration and with reference to the accompanying figures, in which:

FIG. 1 is a diagram of an amplifier for WDM optical signals in a preferred embodiment of the invention;

FIG. 2 shows the gain profile as a function of wavelength respectively for a prior art EDFA and for the amplifier of FIG. 1;

FIG. 3a is a fragmentary longitudinal and perspective view of the FIG. 1 amplifying fiber; and FIG. 3b shows the refractive index profile of the single-mode core and the multimode core of the fiber as a function of distance x from the center of the fiber.

FIG. 1 is a diagram in a preferred embodiment of the invention showing an amplifier 100 for amplifying WDM optical signals $s_u$, e.g. in an enlarged band C extending from 1500 nm to 1565 nm.

The amplifier comprises an amplifying optical fiber 1 in accordance with the invention, having a doped ring with active rare earth ions which are preferably erbium ions. The amplifying optical fiber 1 of structure that is described in greater detail below, is in a glass matrix and is preferably based on silica, possessing a single-mode core and a multimode core. It is long enough to ensure effective discrete Raman amplification.

The amplifier 100 also comprises:

a multimode pump 2 for erbium amplification, of power in the range 1 W to 10 W, and delivering a first pump wave $s_p$ of wavelength equal to 980 nm; and a single-mode pump 3 for Raman amplification, of power approximately 100 milliwatts (mW) to 5 W, and delivering a second pump wave $s'_p$ of wavelength equal to about 1428 nm, for example, in order to obtain Raman amplification at the beginning of band C.

The multimode pump 2 is coupled to a multimode fiber 4 which is itself coupled near the inlet 1a of the fiber 1. In addition, the single-mode pump 3 is coupled to a single-mode fiber 4' which is itself coupled near the outlet 1b of the fiber 1.

In the amplifying fiber 1, the signals $s_u$ and the first pump wave $s_p$ are co-propagating (along the axis in the X direction), whereas the second pump wave $s'_p$ is contra-propagating (along the axis in the opposite direction X').

In addition, the signals $s_u$ and the second pump wave $s'_p$ are guided in the single-mode core.

The amplifier 100 is compact since only a single amplifying fiber is used for the two amplification techniques. The amplifier 100 is also economic in Raman pump power.

In FIG. 2, curves a and b show gain profile as function of wavelength respectively for a conventional doped-ring EDFA provided with a multimode pump analogous to the pump 2, and for the amplifier 100.

The gain of the amplifier 100 is clearly greater in the range 1500 nm to 1600 nm, and it also enables optical signals to be amplified over a broader range of wavelengths by selecting the single-mode pump to have a wavelength of 1428 nm.

FIG. 3a is a fragmentary longitudinal and perspective view of the amplifying optical fiber 1.

FIG. 3a is diagrammatic and not to scale.

The amplifying optical fiber 1 is of cylindrical geometry, for example, and comprises:

a single-mode core 10 of small diameter d1, preferably equal to 3 µm, and having a first refractive index n1;

a multimode core 20 surrounding the single-mode core 10 and having a second refractive index n2 that varies, with an outer diameter d2 equal to about 30 µm, for example; and cladding 30 surrounding the multimode core, with an outer diameter lying in the range 150 µm to 200 µm, and having a third refractive index $n_g$, where $n1 > n2 \geq n_g$.

The single-mode core 10 contains germanium dopants 5 increasing the conventional Raman gain obtained by the silica.

Raman efficiency is equal to about 4 $W^{-1}$ $km^{-1}$.

The multimode core 20 contains a "ring" layer 21 which is doped with erbium ions 6 at a concentration c1. This layer of substantially circular circumference presents an inner radius $r_i$ and an outer radius $r_e$.

The concentration and the position of the ring are adjusted to obtain an absorption maximum of less than 1 dB/m.

Preferably, the length of the fiber is equal to 500 m, the absorption maximum is equal to 0.2 dB/m, and the accumulated absorption is equal to 100 dB.

Thus, the concentration c1 is lower than 300 ppm and preferably about 100 ppm for Raman amplification. The conversion efficiency for erbium amplification is high because of the distribution of erbium 6 in the doped ring.

In addition, the inner radius $r_i$ is equal to approximately 4.25 µm while the outer radius $r_e$ is equal to approximately 6.5 µm.

In FIG. 3b, curve C shows the profile of the first and second refractive indices n1 and n2 as a function of distance x from the center of the fiber (in microns). More exactly, the ordinate corresponds to the difference $n - n_g$ between the first refractive index n1 and the third refractive index $n_g$ and to the difference between the second refractive index n2 and the third refractive index $n_g$.

The diameters d1 and d2 and the inner and outer radii $r_i$ and $r_e$ of the doped ring are referenced on curve C.

The second refractive index n2 decreases between the inside and the outside of the multimode core. More precisely, the second refractive index n2 remains substantially constant out to about 6 µm, and then decreases going out to 15 µm. The difference between the first and second refractive indices n1 and n2 is always greater than 0.01.

Naturally, the invention is not limited to the embodiment described above.

In a variant, the single-mode core 10 contains phosphorous dopants instead of (or in addition to) germanium dopants in order to increase Raman gain, in particular at the bottom margin of band C. In this variant, the wavelength of a Raman pump selected accordingly is equal to about 1305 nm.

In another variant, the wavelength of a Raman pump is not only distinct from a wavelength of any optical signal for amplifying, but is also selected to lie in the gain range obtained by the active rare earth ions so as to amplify the Raman single-mode pump wave.

The cross-section of the fiber may present a multimode core of geometry that is cylindrical, substantially polygonal, or multi-lobed, so as to encourage better absorption of light power by the rare earth doped ring.

The invention is also applicable to band L or any other band.

The fiber may also be made on the basis of fluoride glass.

The erbium-doped ring may contain additional dopants selected from the following: $Li_2O$, $Na_2O$, $K_2O$, $Rb_2O$, $Cs_2O$, BeO, MgO, CaO, SrO, and BaO.

Finally, any means may be replaced by equivalent means without going beyond the ambit of the invention.

What is claimed is:

1. A doped ring amplifying optical fiber comprising:
a single-mode core of given diameter; and
a multimode core surrounding the single-mode core and containing a doped layer, having a predetermined concentration of active rare earth ions, the fiber being configured, because of the active rare earth ions, to amplify an optical signal for injection into the amplifying fiber;

the fiber being characterized in that it is of a length and has Raman efficiency such that the product of said length multiplied by said Raman efficiency is greater than or equal to 0.5 $W^{-1}$, and less than or equal to 5.0 $W^{-1}$, and in that, for said fiber presenting absorption for an injected optical signal due to the presence of active rare earth ions, said absorption being defined by an absorption coefficient expressed in dB/m and presenting a maximum value as a function of the wavelength of said signal, which value is referred to as the absorption maximum, said fiber presents accumulated absorption, corresponding to the product of said length multiplied by said absorption maximum, of the doped layer of the multimode core which is greater than or equal to 100 dB and less than or equal to 300 dB;
wherein a gain is less than or equal to 60 dB.

2. An amplifying optical fiber according to claim 1, characterized in that said length is short enough for said amplification by said active rare earth ions to enable gain of not less than 1 dB.

3. An amplifying optical fiber according to claim 1, characterized in that the absorption maximum is less than or equal to 1 dB/m and the length is greater than or equal to 100 m.

4. An amplifying optical fiber according to claim 1, characterized in that the Raman efficiency is greater than or equal to 3 $W^{-1}km^{-1}$.

5. An amplifying optical fiber according to claim 1, characterized in that said doped ring presents an inner radius ($r_1$) greater than 1.5 µm.

6. An amplifying optical fiber according to claim 1, characterized in that the concentration of active rare earth ions is selected to be lower than or equal to 1000 ppm, and when the rare earth ions are erbium ions, to be lower than or equal to 300 ppm.

7. An amplifying optical fiber according to claim 1, characterized in that the single-mode core having at least a first refractive index and the multimode core having at least a second refractive index, the difference between the first and second refractive indices is greater than or equal to 0.01.

8. An amplifying optical fiber according to claim 1, characterized in that the diameter of the single-mode core is selected to lie in the range 3 µm to 5 µm.

9. An amplifying optical fiber according to claim 1, characterized in that the single-mode core is based on silica or on fluoride glass and is doped by dopants selected from phosphorous, germanium, tellurium, aluminum, and boron.

10. An amplifying optical fiber according to claim 1, characterized in that the doped layer is based on silica or fluoride glass and is doped by additional dopants selected from the following compounds: $Li_2O$, $Na_2O$, $K_2O$, $Rb_2O$, $Cs_2O$, BeO, MgO, CaG, SrO, and BaO.

* * * * *